(12) United States Patent
Akutsu

(10) Patent No.: US 9,334,024 B2
(45) Date of Patent: May 10, 2016

(54) EMERGENCY EVACUATION APPARATUS

(71) Applicant: Ichiro Akutsu, Saitama (JP)

(72) Inventor: Ichiro Akutsu, Saitama (JP)

( * ) Notice: Subject to any disclaimer, the term of this patent is extended or adjusted under 35 U.S.C. 154(b) by 0 days.

(21) Appl. No.: 14/421,897

(22) PCT Filed: Jun. 21, 2013

(86) PCT No.: PCT/JP2013/067055
§ 371 (c)(1),
(2) Date: Feb. 16, 2015

(87) PCT Pub. No.: WO2014/030419
PCT Pub. Date: Feb. 27, 2014

(65) Prior Publication Data
US 2015/0217842 A1 Aug. 6, 2015

(30) Foreign Application Priority Data

Aug. 22, 2012 (JP) ................. 2012-182894

(51) Int. Cl.
*B63C 9/06* (2006.01)
*B63B 9/06* (2006.01)
*B63B 19/00* (2006.01)
*E04H 9/14* (2006.01)

(52) U.S. Cl.
CPC . *B63B 9/06* (2013.01); *B63B 19/00* (2013.01); *E04H 9/145* (2013.01)

(58) Field of Classification Search
CPC ............ B63C 9/06; B63B 19/00; E04H 9/145

USPC .......................... 114/365, 367, 349
See application file for complete search history.

(56) References Cited

U.S. PATENT DOCUMENTS

| 282,937 | A | * | 8/1883 | Vaughan | ................... 114/365 |
| 7,069,874 | B2 | * | 7/2006 | Lavorata | ............... B63C 9/02 |
| | | | | | 114/365 |

FOREIGN PATENT DOCUMENTS

| JP | 1983163393 U | 10/1983 |
| JP | 2004322939 A | 11/2004 |
| JP | 2006226099 A | 8/2006 |
| JP | 2007177600 A | 7/2007 |
| JP | 2008074385 A | 4/2008 |
| JP | 2008174919 A | 7/2008 |
| JP | 2010150814 A | 7/2010 |
| JP | 3176504 U | 5/2012 |

* cited by examiner

*Primary Examiner* — Stephen Avila
(74) *Attorney, Agent, or Firm* — Li & Cai Intellectual Property (USA) Office

(57) ABSTRACT

The present invention provides an emergency evacuation apparatus comprises: an annular floating body (1) having a hollow chamber of watertight construction, a midsection thereof having a circular or oval cross-section; a support (2) on which the annular floating body is placed; and guiding member (3) for passing through a central space in the annular floating body so that there is play therebetween and vertically guiding the annular floating body, the guiding member being secured to the support, whereby the floating body capable of accommodating people and possessions floats during a flood or tsunami, and the floating body can return to an original installation location when the flood or tsunami ends.

12 Claims, 6 Drawing Sheets

EMERGENCY EVACUATION APPARATUS

TECHNICAL FIELD

The present invention relates to an emergency evacuation apparatus for evacuating people and valuable possessions during the onset of a tsunami or another emergency, floating during the approach of a tsunami or in other events, and minimizing loss of human life and damage to belongings.

TECHNICAL BACKGROUND

Generally, strategies for combating tsunamis, floods, and other water-related disasters have centered on local authorities. In the case of tsunamis, for example, massive breakwaters are built to prepare for a tsunami onset, or, when a tsunami warning has been issued, instructions to make swift evacuation to higher ground are issued.

However, massive breakwaters were broken by the unexpected major tsunami produced by the Great East Japan Earthquake, failing to stop the approach of the tsunami and leading to numerous deaths. Individuals who evacuated to higher ground at the time survived. First evacuating to higher ground is of utmost importance and a fundamental part of surviving a disaster. However, even when there are designated tsunami evacuation sites, these are often located at natural high ground. Due to the natural topography, it may take effort to reach these evacuation sites, which are not necessarily easy to utilize. Wheelchair users, the elderly, children, and other socially disadvantaged individuals experience particular difficulties.

For this reason, various types of tsunami evacuation facilities have been proposed that can be used without hesitation during an emergency, yield the same effects as evacuation to higher ground even without having to actually climb to higher ground, and can be safely used by the socially disadvantaged as described above.

For example, there has been proposed a facility that can be used for keeping pets or as a garage during normal circumstances, while allowing even children and the elderly to reliably evacuate during a tsunami or flood (see Patent Document 1). This facility is moored to the ground by a link, whereby the facility returns to its original position without drifting when the water ebbs. The facility functions as a disaster preventive shelter into which people retreat during a tsunami or flood, the shelter floating when the surrounding area is filled with water to improve the safety of disaster victims.

There has additionally been proposed a base-isolated construction for avoiding flood damage in which a building does not flood during high-tide flooding (see Patent Document 2). This construction is provided with a foundation having an open upper surface and comprising side walls and a bottom surface, a floating body is accommodated inside the foundation, and the building is constructed on the floating body. Provided are transmission means for cushioning and transmitting the vibration of an earthquake and a damper for limiting the amplitude of the vibrations are provided between the floating body and the building; as well as an anchor pole formed integrally with the floating body and extending/retracting below the floating body, and a locking member on the foundation bottom surface that locks integrally with the foundation. The anchor pole and locking member are configured to engage and integrate, and the floating body raises and lowers the anchor pole during flooding so that the building does not flood.

There has also been proposed a disaster preventive shelter structured to improve the safety of disaster victims during a tsunami or flood (see Patent Document 3). This disaster preventive shelter has a hollow structure of substantially spherical shape comprising a watertight interior space, and is provided with an entrance that can be closed in a watertight state by opening/closing doors, the bottom part of the hollow structure being provided with a mass for balance. During a disaster, the disaster preventive shelter floats on the water while people are accommodated in the interior space.

There has additionally been proposed a tsunami shelter apparatus for improving safety and saving many trapped disaster victims as a tsunami evacuation facility that floats but is not washed away (see Patent Document 4). The body of this tsunami shelter evacuation facility comprises a hemispherical evacuation chamber in the upper part and a hemispherical flotation chamber in the lower part, the bottom-most part of the flotation chamber being linked to foundation ground by a tethering cable. This allows the tsunami shelter apparatus to float while remaining connected to the ground by the tethering cable, and suppresses shaking.

PRIOR ARTS LIST

Patent Document 1: Japanese Laid-open Patent Publication No. 2007-177600
Patent Document 2: Japanese Laid-open Patent Publication No. 2010-150814
Patent Document 3: Japanese Laid-open Patent Publication No. 2004-322939
Patent Document 4: Japanese Laid-open Patent Publication No. 2008-074385

SUMMARY OF THE INVENTION

Problems to be Solved by the Invention

As described above, various emergency evacuation facilities that can be used in the event of tsunamis and other emergencies have been proposed. However, although the facilities proposed in Patent Documents 1 and 2 fulfill the function of disaster preventive shelters as long as the water level during a tsunami or flood remains within a predicted range, these facilities may flood or be destroyed during the onset of a major tsunami or flood in which the water level exceeds predictions.

Furthermore, because the disaster preventive shelter proposed in Patent Document 3 has a hollow structure of substantially spherical shape comprising a watertight interior space, the disaster preventive shelter stably floats during the onset of a tsunami or flood and avoids water pressure; however, this presents a drawback in that the disaster preventive shelter may be carried away from the location at which it was installed. Because the body of the tsunami shelter proposed in Patent Document 4 is linked to foundation ground by a tethering cable, the tsunami shelter floats during the gradual onset of a tsunami and shaking of the tsunami shelter is suppressed; however, during the onset of a major tsunami that exceeds predictions, the body may shake without resisting the current because the body is linked by the tethering cable, and, according to the circumstances, the tethering cable may break and the tsunami shelter may be carried away. Furthermore, even when the tethering cable does not break, a problem is presented in that returning the body to the original location at which it was installed requires time and effort and is bothersome.

With the foregoing problems in view, it is an object of the present invention to provide an emergency evacuation apparatus in which a floating body capable of accommodating people and possessions floats while avoiding high water pressure caused by a current even during the surge of a flood or tsunami in which the water level exceeds predictions, the floating body being made to be able to return to an original installation location when the flood or tsunami ends.

Means to Solve the Problems

To address the problems described above, the invention of the present application adopts the configuration described below.

(1) The emergency evacuation apparatus of the present invention comprises a hollow chamber of watertight construction, the emergency evacuation apparatus being provided with: an annular floating body having a hollow chamber of watertight construction, and the cross-section of the annular floating body being circular or oval; a support on which the annular floating body is placed; and a guiding having a guiding post which is passed through a central space in the annular floating body and secured to the support, the outer diameter on the lower part of the guiding post being made smaller than the diameter of the central space, the outer diameter on the upper part of the guiding post being made smaller than the lower part. There is play between the annular floating body and the guiding post. The guiding member guides the annular floating body upward or downward in accordance with the water level during a tsunami or flood.

(2) The emergency evacuation apparatus of (1), wherein the guiding member has a guiding post, one end of which being secured to the support, and the other end of which being connected to a wire or chain extending from a support pillar vertically arranged and set apart from the annular floating body.

(3) The emergency evacuation apparatus of (1) or (2), wherein the support comprises a concave part of such depth that the annular floating body floats when the concave part is filled with water.

(4) The emergency evacuation apparatus of (3), wherein the support has a drain cock for discharging the water filling the concave part.

(5) The emergency evacuation apparatus of any of (1) through (4), wherein the annular floating body comprises an opening/closing aperture of watertight construction through which a person can enter/exit or articles can be carried in/out.

Advantageous Effects of the Invention

As described above, according to the emergency evacuation apparatus of the present invention, guiding member that passes through a central space in an annular floating body having a hollow chamber of watertight construction so that there is play therebetween is secured to a support on which the annular floating body is placed; therefore, during the onset of a tsunami or flood, the annular floating body floats above the support and is vertically guided along the guiding member as the water level rises and falls. Therefore, the annular floating body can easily avoid water pressure caused by a current, and is configured to not be readily destroyed by water pressure. Furthermore, when the tsunami or flood ends, the annular floating body returns to an original installation location on the support, making cleanup easy.

A wire or chain extending from a support pillar vertically arranged and set apart from the installation location of the annular floating body is connected to the guiding member; therefore, the annular floating body floats in coordination with the wire or chain and is guided in accordance with the water level of an approaching tsunami or flood, even when the water level exceeds the height of the guiding member. Therefore, the annular floating body can easily avoid water pressure caused by a current to avoid being destroyed by the water pressure, and, when the tsunami or flood ends, the annular floating body can return to the original installation location.

Furthermore, a concave part that can be filled with water is formed in the support on which the floating body is placed. The concave part is ordinarily empty, but fills with water during the onset of a tsunami or flood; therefore, because the annular floating body to be returned to the original location floats on the surface of the water in the concave part when the tsunami or flood ends, rubble or the like caught in the concave part can readily be removed while the annular floating body is floating, and even if the annular floating body changes in orientation when the annular floating body returns, the orientation can easily be changed by mere human power.

The annular floating body in the emergency evacuation apparatus configured as described above floats stably even in a severe current in a tsunami or flood, and people that have been evacuated during an emergency as well as valuable possessions, documents, etc. can safely be protected inside the annular floating body.

DESCRIPTION OF THE EMBODIMENTS

In the embodiments below relating to the emergency evacuation apparatus of the present invention, working examples are shown and specifically described with reference to FIGS. 1-6.

Working Example

Figure 1:
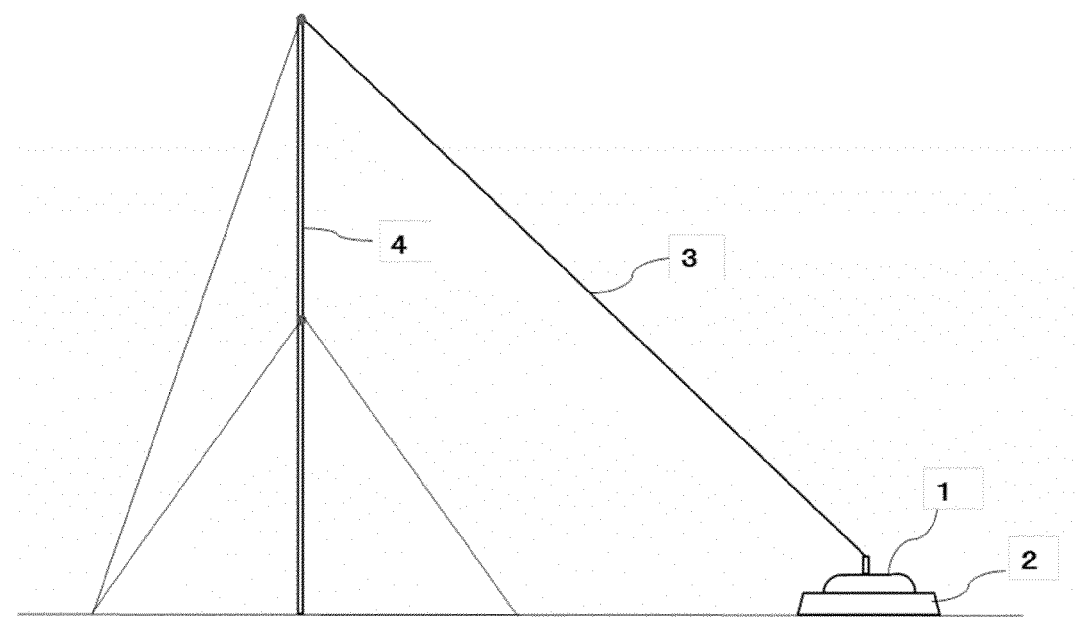
FIG. 1 is a schematic diagram of the emergency evacuation apparatus of the present invention.

FIG. 1 shows a complete schematic relating to a working example of the emergency evacuation apparatus of the present invention. As shown in FIG. 1, an emergency evacuation apparatus configured as a countermeasure to floods, tsunamis, and other disasters is essentially configured from an annular floating body 1, a support 2, and guiding member 3. The support 2 is installed above ground, and the guiding member 3 connects the support 2 and the upper end of a support pillar 4 provided at a position set apart from that of the support 2. The support pillar 4 is reinforced by a wire or the like so as not to fall during the surge of a flood or tsunami. Because it is also effective to allow the support pillar to bend in order to resist water pressure caused by a flood or tsunami, the lower end of the support pillar 4 may be made to perform limited angular motion via a hinge or the like rather than being completely secured.

Next, the specific configuration of the emergency evacuation apparatus will be described with reference to FIGS. 2-4. Components common to these drawings are given the same symbols.

Figure 2:
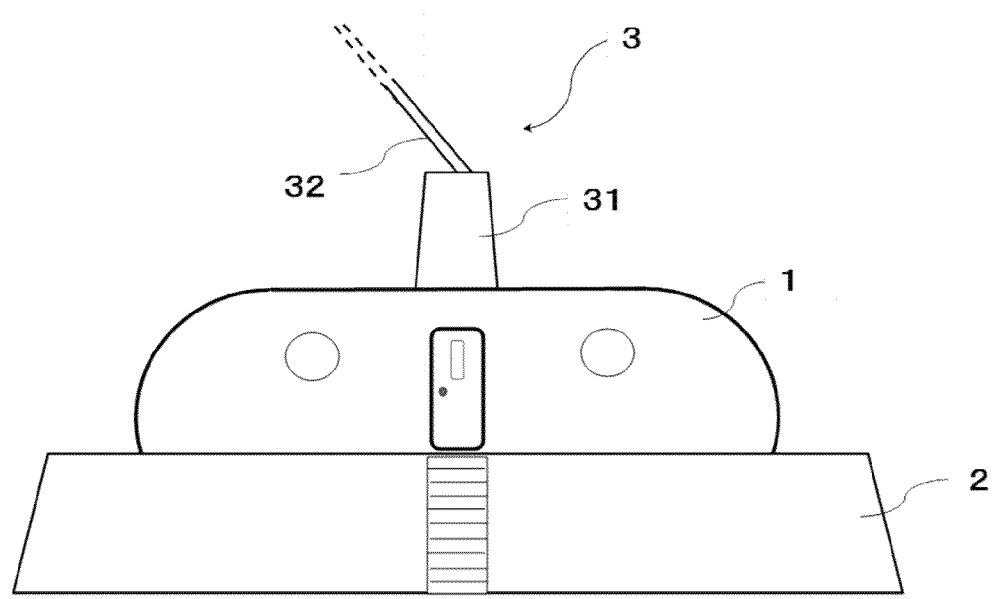
FIG. 2 is an enlarged side view of the emergency evacuation apparatus shown in FIG. 1.

FIG. 2 shows an enlarged view of the emergency evacuation apparatus shown in FIG. 1 in a situation in which the annular floating body 1 is placed on the support 2.

The midsection component of the annular floating body 1 is formed from, e.g., steel, and has a hollow interior. Articles of value may be held in the interior hollow chamber in preparation for a flood, tsunami, or other disaster, or a door that can open and close may be provided so that people can evacuate in an emergency during such an occurrence. This door may be designed so watertightness can be maintained when the door is closed from the inside. The annular floating body 1 minimizes water pressure caused by a flood or tsunami, is designed to be able to avoid the force of a severe current, and is formed to be able to float stably even in the current of a flood or tsunami. At least the lower side of the midsection component of the annular floating body has a double-layered structure, whereby the strength of the floating body can be increased, and the floating body can be prevented from being destroyed by collision with objects being carried along by a flood or tsunami. A collision-buffering member may be provided to the outer peripheral surface of the annular floating body.

The guiding member 3 is configured from a guiding post 31 vertically arranged in the center of the support 2, and a wire 32 secured to the upper end of the support pillar 4, the wire 32 also being secured to the upper end of the guiding post 31. The guiding post 31 penetrates the annular floating body 1 by being configured to be inserted through the central space therein. The guiding post 31 and the annular floating body 1 are preferably made to move freely rather than being secured to each other. For example, the outer periphery of the guiding post 31 may be made to incline, the outer diameter on the lower part of the guiding post 31 may be made slightly smaller than the diameter of the central space of the annular floating body 1 to facilitate positioning thereof, the outer diameter on the upper part of the guiding post 31 may be made smaller than the outer diameter of the lower part, and the entirety of the guiding post 31 may freely fit so the annular floating body 1 readily moves upward and downward.

Although an example configured from a wire is shown, the present invention is not limited thereto; any chain or the like may be used that can guide the annular floating body 1 upward or downward in accordance with the water level during a tsunami or flood, and can be made to resist a current and not be carried away. When the predicted water level is low and the assumption is that there will be no onset of a tsunami or flood having a higher level, the guiding member may be configured merely from the guiding post provided to the support, and the height of the guiding post can be set in conformance to the water level.

In the event of the approach of a flood or tsunami in which the water level exceeds predictions, the annular floating body floats at or above the height of the guiding post and drifts. However, the drifting annular floating body is stable with little danger of capsizing; therefore, people that have been evacuated into the hollow chamber during an emergency as well as valuable possessions, documents, etc. are sheltered without incident even if the annular floating body drifts a long distance. Even in a case when the wire or the like breaks, people that have been evacuated into the hollow chamber during an emergency as well as valuable possessions, documents, etc. are similarly sheltered without incident even if the annular floating body drifts a long distance.

Figure 3:
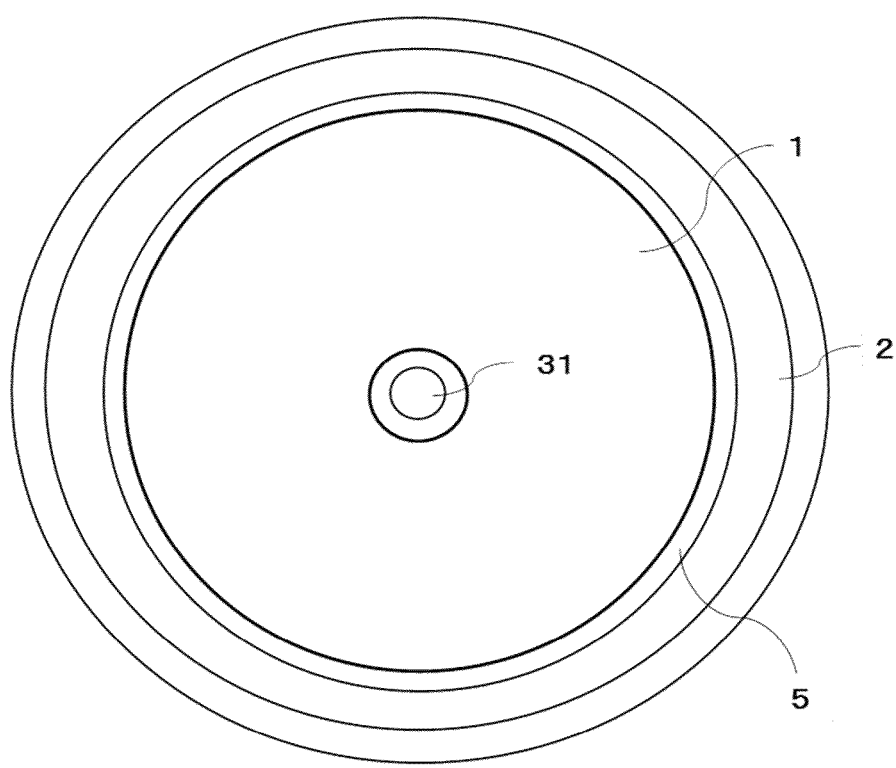
FIG. 3 is a top view showing the emergency evacuation apparatus shown in FIG. 2 as seen from above.
Figure 4:
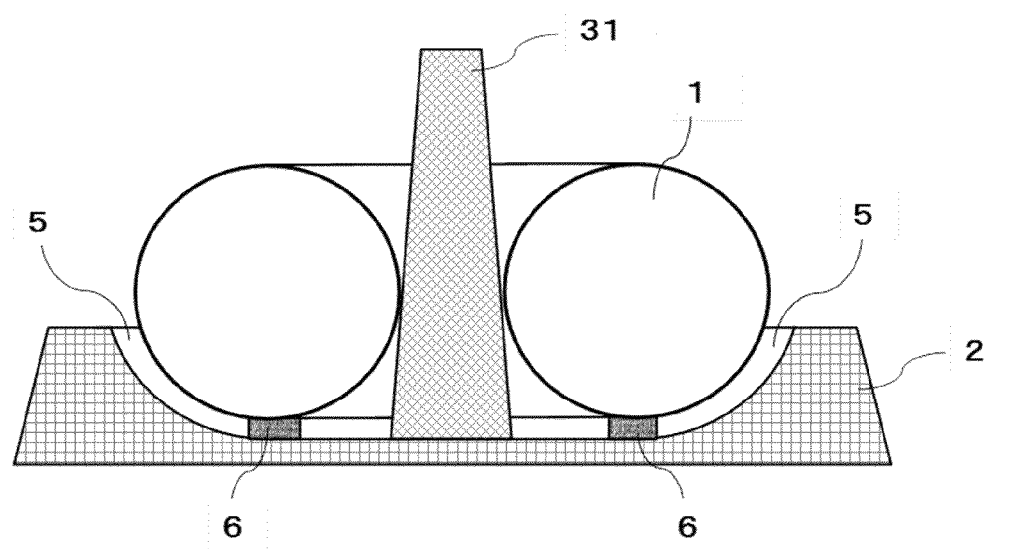
FIG. 4 is a cross-sectional view of the emergency evacuation apparatus shown in FIG. 2.

FIG. 3 shows a top view of the emergency evacuation apparatus as seen from above, and FIG. 4 shows a cross-sectional view of the emergency evacuation apparatus. Because the basic shape of the floating body in the emergency evacuation apparatus of the present invention is annular, the concave part 5 formed in the support 2 in the emergency evacuation apparatus shown in FIG. 3 is similarly of circular shape in conformance to the shape of the floating body. The outer diameter on the upper end of the concave part 5 is set larger than the outer diameter of the annular floating body 1. When the annular floating body 1 is placed in the concave part 5, specifically, during periods where no major event is occurring, a space is formed between the inner surface of the concave part 5 and the outer surface of the lower part of the annular floating body 1. This is not only to facilitate cleaning and the like inside the concave part 5, but also to facilitate entry of the water into the concave part 5 and allow the annular floating body 1 to quickly float. The concave part is not limited to a circular shape; a polygonal or other shape capable of accommodating the annular floating body may be used.

Figure 5:
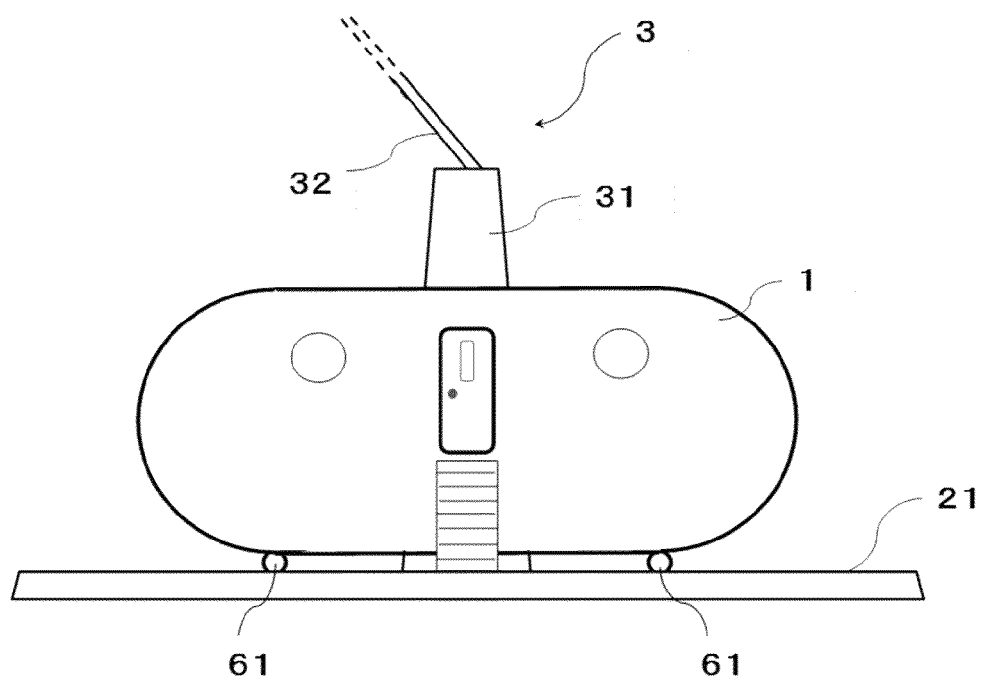
FIG. 5 is a schematic diagram of a modification of the emergency evacuation apparatus of the present invention.
Figure 6:
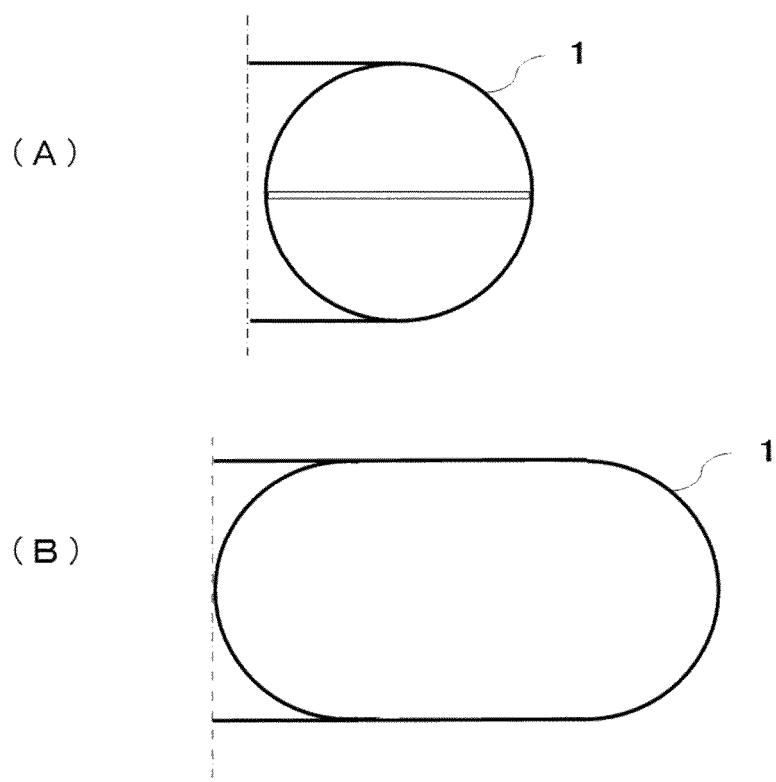
FIG. 6 is a view of modifications of the annular floating body in the emergency evacuation apparatus of the present invention.

The support 2 in the emergency evacuation apparatus is of circular construction overall, and is constructed to reduce water pressure received from a current without being destroyed. When the direction of onset of a flood or tsunami can be anticipated, the outer peripheral wall of the support 2 can be reinforced, or a water-pressure-reducing member can be set up. The guiding post 31 of the guiding member 3 is vertically arranged in the center of the concave part 5 in the support 2. Furthermore, a plurality of mounting members 6 are disposed in the bottom part of the concave part 5, the annular floating body 1 being disposed in the concave part 5 with the mounting members 6 interposed therebetween. Alternatively, instead of disposing the mounting members 6 in the concave part 5, wheeled casters 61 can be provided to the bottom surface of the annular floating body 1 as shown in FIG. 5. This makes it possible for the annular floating body 1 to move during periods when no major event is occurring and facilitates repositioning. Furthermore, the support 2 of an emergency evacuation apparatus as shown in FIG. 5 may not form a concave part 5 so the surface of the support 2 is flat.

During periods when no major event is occurring, it is important at least that the annular floating body be placed on the support; the concave part 5 is not instrumental to an emergency evacuation. However, the annular floating body 1 floats upward during the onset of a flood or tsunami, and afterward, when the water level decreases due to the flood waning or the tsunami ending, water remains inside the concave part 5. At this time, the annular floating body 1 descends along the guiding member 3 together with the decrease in water level, and floats on the water remaining in the concave part 5. Therefore, having the annular floating body 1 float after the end of a flood or tsunami not only simplifies removal of rubble from and cleaning of the concave part 5, but also makes it possible to easily move the annular floating body 1 by hand and simplifies the return thereof to the original location. Furthermore, if a drain cock for discharging water is provided to the support 2, the water remaining in the concave part 5 can be emptied out, allowing a resumption of the state preceding the onset of the flood or tsunami.

The annular floating body 1 of the emergency evacuation apparatus in the above embodiment is described as having a midsection component of circular cross-section; however, providing a floor inside the hollow chamber of the midsection component to form two vertically arranged chambers, as shown in FIG. 6(A), makes it possible to increase the capacity. Furthermore, it is possible to increase the number of floors to form a multi-floor structure. Alternatively, as shown in FIG. 6(B), the midsection component of the annular floating body 1 can be formed in an oval shape. In this case, the floating body becomes appreciably flatter, safety can be further improved with respect to a current during the onset of a tsunami or flood, and capacity can be increased.

The construction of the emergency evacuation apparatus of the present invention has been described above with a focus on use during an emergency evacuation. Next, methods of use during normal times relating to the emergency evacuation apparatus of the present invention will be described.

An annular hollow chamber is provided inside the annular floating body of the emergency evacuation apparatus, the hollow chamber being used during an evacuation due to a tsunami, flood, or other emergency as a location for accommodating evacuees or valuable possessions, documents, etc. that have been carried in. Furthermore, a barrier or the like can be provided to the upper surface part of the annular floating body to increase the number of people who can be accommodated. However, during periods when there is no onset of a tsunami or flood, the hollow chamber remains empty. Even during such periods, concerns related to installation cost and convenience suggest that the annular floating body should be used effectively.

For example, when installed at a seashore or harbor, the emergency evacuation apparatus can be used in a storehouse, shop, restaurant, beach house, or other such structure. During an evacuation due to the onset of a tsunami or other emergency, the emergency evacuation apparatus is of great benefit as a nearby emergency evacuation location in cases when there is no time to evacuate to higher ground, or when evacuation is difficult. If a solar power generation system is provided on the upper surface part of the annular floating body, an emergency power supply can be used for an emergency broadcast or the like during an emergency. Furthermore, the annular floating body can also be used as a fuel tank. In this case, the floating body will tend not to break even during the onset of a tsunami because it floats and avoids the current; therefore, fuel can be prevented from leaking out, and fires caused by such fuel can be eliminated.

REFERENCE SIGNS LIST

1: Annular floating body
2, 21: Support
3: Guiding member
31: Guiding post
32: Wire
4: Support pillar
5: Concave part
6: Mounting member
61: Caster

What is claimed is:

1. An emergency evacuation apparatus, comprising:
an annular floating body having a hollow chamber of watertight construction, and the cross-section of the annular floating body being circular or oval;
a support on which the annular floating body is placed; and
a guiding member having a guiding post which is passed through a central space in the annular floating body and secured to the support, the outer diameter on the lower part of the guiding post being made smaller than the diameter of the central space, the outer diameter on the upper part of the guiding post being made smaller than the lower part, the guiding member guides the annular floating body upward or downward in accordance with the water level during a tsunami or flood.

2. The emergency evacuation apparatus of claim 1, wherein the guiding member has a wire or chain, one end of which being connected to the upper of the guiding post, and the other end of which being connected an upper end of a support pillar being made higher than the guiding post, the support pillar is vertically arranged and set apart from the annular floating body.

3. The emergency evacuation apparatus of claim 1, wherein the support comprises a concave part of such depth that the annular floating body floats when the concave part is filled with water.

4. The emergency evacuation apparatus of claim 3, wherein the support has a drain cock for discharging the water filling the concave part.

5. The emergency evacuation apparatus of claim 1, wherein the annular floating body comprises an opening/closing aperture of watertight construction through which a person can enter/exit or articles can be carried in/out.

6. The emergency evacuation apparatus of claim 2, wherein the support comprises a concave part of such depth that the annular floating body floats when the concave part is filled with water.

7. The emergency evacuation apparatus of claim 6, wherein the support has a drain cock for discharging the water filling the concave part.

8. The emergency evacuation apparatus of claim 2, wherein the annular floating body comprises an opening/closing aperture of watertight construction through which a person can enter/exit or articles can be carried in/out.

9. The emergency evacuation apparatus of claim 3, wherein the annular floating body comprises an opening/closing aperture of watertight construction through which a person can enter/exit or articles can be carried in/out.

10. The emergency evacuation apparatus of claim 6, wherein the annular floating body comprises an opening/closing aperture of watertight construction through which a person can enter/exit or articles can be carried in/out.

11. The emergency evacuation apparatus of claim 4, wherein the annular floating body comprises an opening/closing aperture of watertight construction through which a person can enter/exit or articles can be carried in/out.

12. The emergency evacuation apparatus of claim 7, wherein the annular floating body comprises an opening/closing aperture of watertight construction through which a person can enter/exit or articles can be carried in/out.

* * * * *